(12) United States Patent
Ciccone

(10) Patent No.: US 7,972,127 B2
(45) Date of Patent: Jul. 5, 2011

(54) WEDGE-LOCK SYSTEM FOR INJECTION MOLDS

(75) Inventor: Vince Ciccone, Kleinburg (CA)

(73) Assignee: Top Grade Molds Ltd., Mississauga, Ontario (CA)

( * ) Notice: Subject to any disclaimer, the term of this patent is extended or adjusted under 35 U.S.C. 154(b) by 218 days.

(21) Appl. No.: 12/138,772

(22) Filed: Jun. 13, 2008

(65) Prior Publication Data

US 2008/0311236 A1    Dec. 18, 2008

Related U.S. Application Data

(60) Provisional application No. 60/943,608, filed on Jun. 13, 2007.

(51) Int. Cl.
*B29C 45/26* (2006.01)
(52) U.S. Cl. ..................... 425/168; 425/192 R; 425/468
(58) Field of Classification Search ................... 425/168, 425/192 R, 468, 577; 249/144
See application file for complete search history.

(56) References Cited

U.S. PATENT DOCUMENTS

| | | | | |
|---|---|---|---|---|
| 3,930,780 A | * | 1/1976 | Lovejoy | 425/468 |
| 3,932,085 A | * | 1/1976 | Horbach | 425/577 |
| 3,942,755 A | | 3/1976 | Robinson | |
| 4,733,801 A | * | 3/1988 | Scammell | 425/577 |
| 4,775,130 A | * | 10/1988 | Von Holdt | 425/192 R |
| 4,856,977 A | * | 8/1989 | Von Holdt | 425/468 |
| 5,776,517 A | | 7/1998 | Ciccone et al. | |

FOREIGN PATENT DOCUMENTS

JP       2002036296 A    2/2002

* cited by examiner

*Primary Examiner* — James Mackey
(74) *Attorney, Agent, or Firm* — Hodgson Russ LLP

(57) ABSTRACT

A wedge-lock system for injection molds, using a protrusion on one side of the mold and a mating opening and sets of wedges which act together upon mold closing to provide and maintain accurate centering of the core and cavity halves in reference to each other, to prevent core shifts and compensate for uneven thermal expansion of mold components.

15 Claims, 10 Drawing Sheets

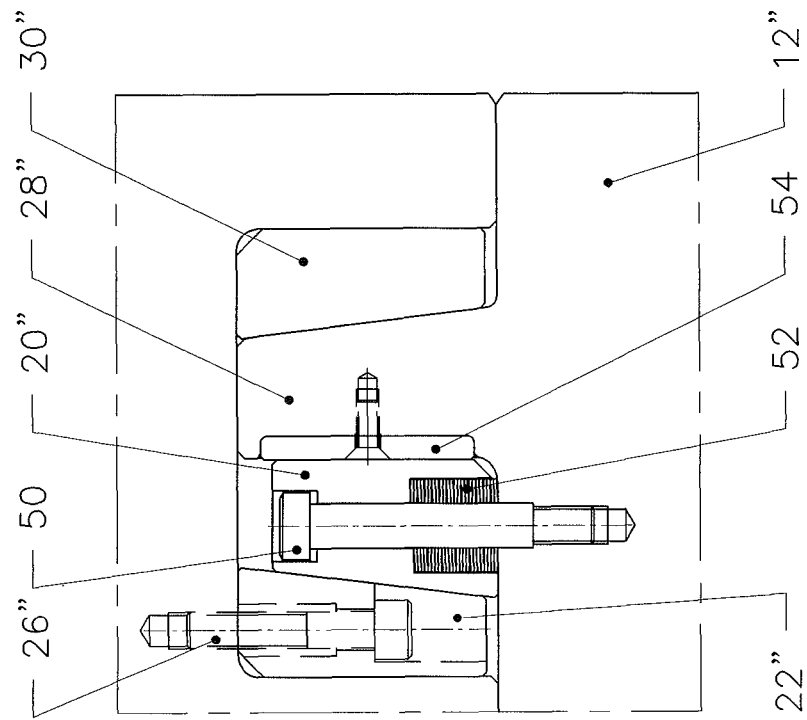
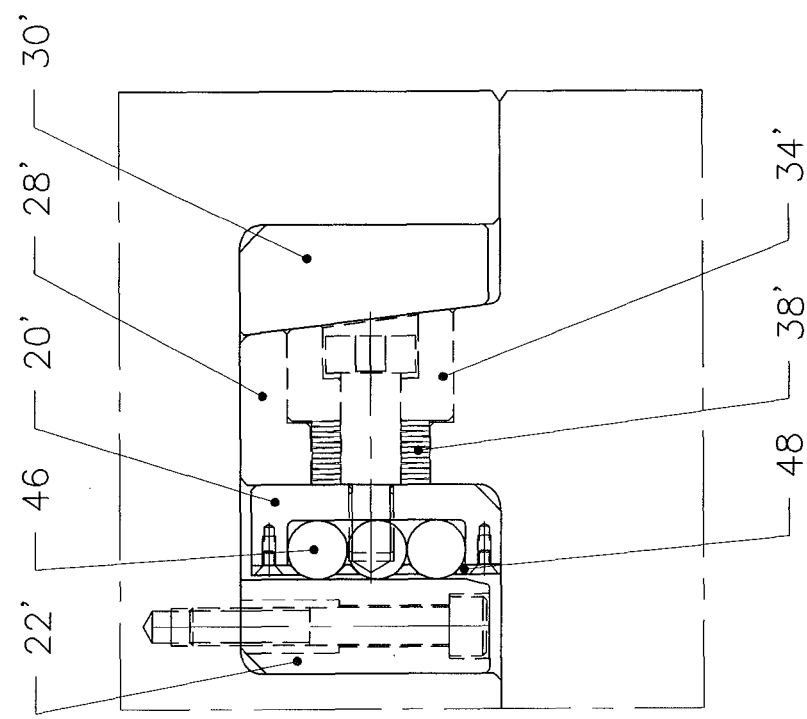

WEDGE-LOCK SYSTEM FOR INJECTION MOLDS

FIELD OF THE INVENTION

The present invention relates to plastic injection molds, and in particular to a centering wedge system to maintain concentricity between core and cavity halves and achieve consistent wall thickness of the molded parts.

BACKGROUND OF THE INVENTION

A common challenge of injection molds is the difficulty to achieve and maintain a uniform wall thickness of the molded part while overcoming and compensating for various injection molding processing conditions. Prior art injection molds typically have a core versus cavity locking system, with wedges having various clamp angles such as 7° to 20° angles. While the clamping force of the injection press holds the mold closed during injection, injection forces sometimes overcome the clamping force, causing the mold to breathe at the parting line. As an example, a breathing gap of 0.001"-0.007" at the parting line, combined with angles of 7°-20° on wedges, produces gaps of 0.0009"-0.0024" between core and cavity wedges, resulting in loss of concentricity where one side of the mold half shifts out of center to the opposing side and causes inconsistent wall thickness of the molded part. A typical procedure to restore concentricity is to shim the wedges; this method however is time consuming and offers only temporary results since the processing conditions that caused the core verses cavity shifting is continuously present. A solution to counter this problem is to use smaller angles on wedges (3° or 1° or less), but such small angle makes for difficult control of thermal expansions and tends to cause the wedges to gall and/or seize. Furthermore the tolerances required to build a mold and maintain the same mold increases which results in more cost.

Therefore, existing locking systems pose an ongoing challenge to remove the floating effect caused by high injection pressures. A solution is desired, which allows the locking system to constantly self-adjust in order to maintain concentricity, while allowing control of thermal expansions and preventing galling of the wedges ans.

SUMMARY OF THE INVENTION

The present invention is directed towards a wedge-lock system for injection molds, using sets of wedges which act together upon mold closing to provide and maintain accurate centering of the core and cavity halves in reference to each other, to prevent core shifts and compensate for uneven thermal expansion of mold components, whilst using the clamping force of the injection press to aid the centering of mold halves.

In accordance with an aspect of the invention there is provided, a wedge lock system for injection molds comprising a mating core block and cavity block which move between an open position and closed position, and in said closed position molten plastic may be injected between the faces of said core and cavity blocks to form a plastic injection mold product, said wedge lock system comprising: a forward protrusion in the core block which mates with a corresponding opening in the cavity block, said protrusion having a first lateral side and an opposite angled lateral side; a first cavity wedge, secured to the cavity block within the cavity block opening; a core wedge assembly including a core wedge piece positioned adjacent the first side of the protrusion and being connected by compressible attachment means which extends laterally through said protrusion to at least one floating puck, said at least one puck extending laterally outwardly from said angled side of the protrusion; a second cavity wedge secured to the cavity block having a mating angled surface to the angled side of the protrusion, which in said closed position, engages the angled side of said protrusion and urges said laterally outwardly extending at least one floating puck inwardly to compress said compressible attachment means and thereby urge said core wedge piece into firm contact with said first cavity wedge.

In accordance with a further aspect of the invention, there is provided a wedge lock system for injection molds comprising a mating core block and cavity block which move between an open position and closed position, and in said closed position molten plastic may be injected between the faces of said core and cavity blocks to form a plastic injection mold product, said wedge lock system comprising: a wedge compressibly mounted to the face of said core block or cavity block, biased in a floating position away from said block, said wedge having an angled surface to the direction of movement of the mold machine, said wedge being compressed against said block as the angled surface of the wedge comes into engagement with a mating angled surface of a wedge secured to the opposite side of the mold (or with a mating angled surface of the opposite side of the mold directly), as the mold approaches the closed position thereby providing enhanced clamping force in the closed position during plastic injection.

In accordance with a further aspect of the invention, there is provided, a wedge lock system for injection molds comprising a mating core block and cavity block which move between an open position and closed position, and in said closed position molten plastic may be injected between the faces of said core and cavity blocks to form a plastic injection mold product, said wedge lock system comprising: a forward protrusion in the core block (or cavity block) which mates with a corresponding opening in the opposite block, said protrusion having a first angled lateral side and an opposite angled lateral side; a first opposite block portion, situated opposite said first angled lateral side of the protrusion having a mating surface to the first angled side of the protrusion; a second opposite block portion, situated opposite said second angled lateral side, wherein, in said closed position, said first and second opposite block portions engage the respective first and second angled sides of the protrusions, thereby creating increased clamping force in the closed position. Wedges may be secured to one or both sides of the protrusion and/or one or more of the opposite block portions.

Other advantages, features and characteristics of the present invention, as well as methods of operation and functions of the related elements of the structure, and the combination of parts and economies of manufacture, will become apparent upon consideration of the following detailed description and the appended claims with reference to the accompanying drawings, the latter being briefly described hereinafter.

BRIEF DESCRIPTION OF THE DRAWINGS

FIG. 9 is an enlarged detail of a cross-section similar with that of FIG. 8A, but of a first alternate embodiment using floating core wedges, spring-activated transversally and providing roller bearing contact between core and cavity wedges.

FIG. 10 is an enlarged detail of a cross-section similar with that of FIG. 8A, but of a second alternate embodiment using floating core wedges, spring-activated axially.

DETAILED DESCRIPTION OF THE INVENTION

Figure 1:
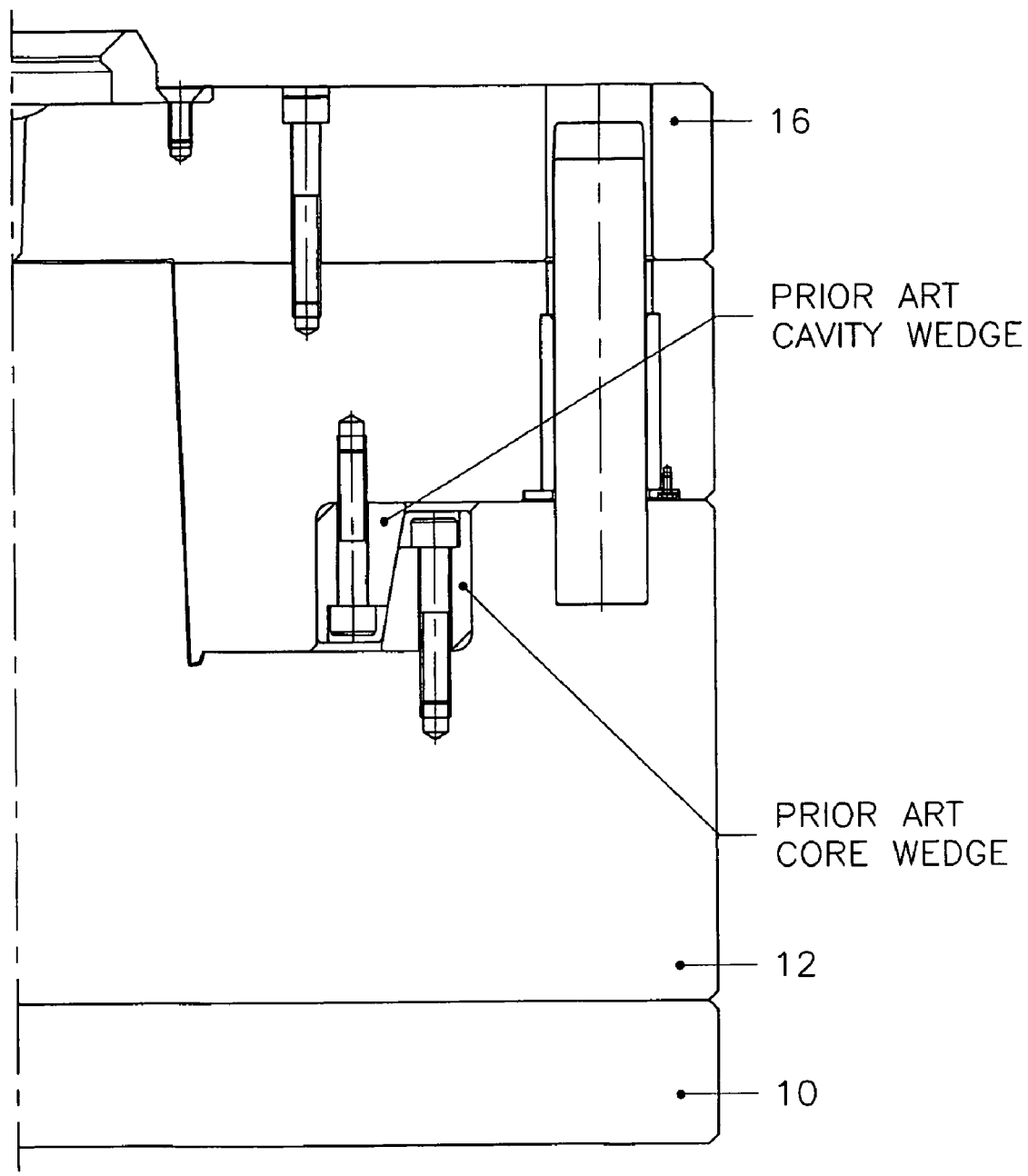
FIG. 1 is an exemplary vertical sectional view of an injection mold of prior art, having a locking system comprising core and cavity wedges with a taper between 7° and 20°.

An example embodiment of the invention is described with reference to FIGS. 1 to 7, and in particular the sectional views of FIG. 4 and FIG. 4A. A typical injection mold comprises a bottom plate 10, a core block 12, a cavity block 14, and a top plate 16. Bottom plate 10 and top plate 16 are securely attached to the injection machine platens (not shown), and the mold opening and closing motion is guided by a leader pin system 18.

In accordance with an aspect of the invention, core wedges (also referred to as core wedge pieces) 20, together with cavity wedges 22, form the main locking system 24 of the mold. In the embodiment shown, cavity wedges 22 are firmly secured to the cavity block 14 with socket head cap screws 26 or other suitable means. Core wedges 20 are attached to but not secured firmly to core block 12, being allowed to float as will be explained in more detail below. In the embodiment shown, core wedges 20 and cavity wedges 22 have a small taper (0°-3°).

Figure 4:
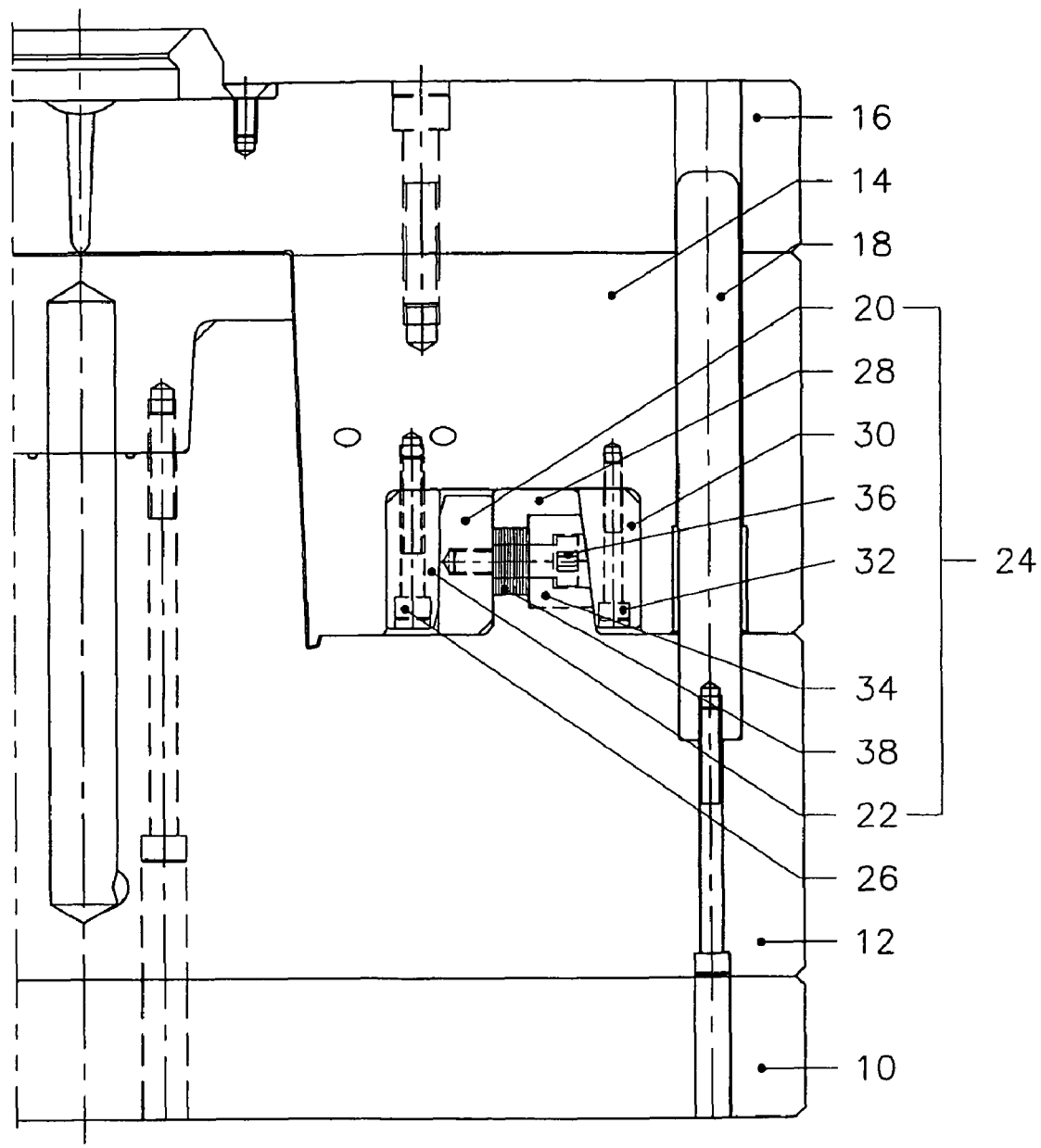
FIG. 4 is an exemplary vertical sectional view taken along line A-A of FIG. 2.
Figure 4A:
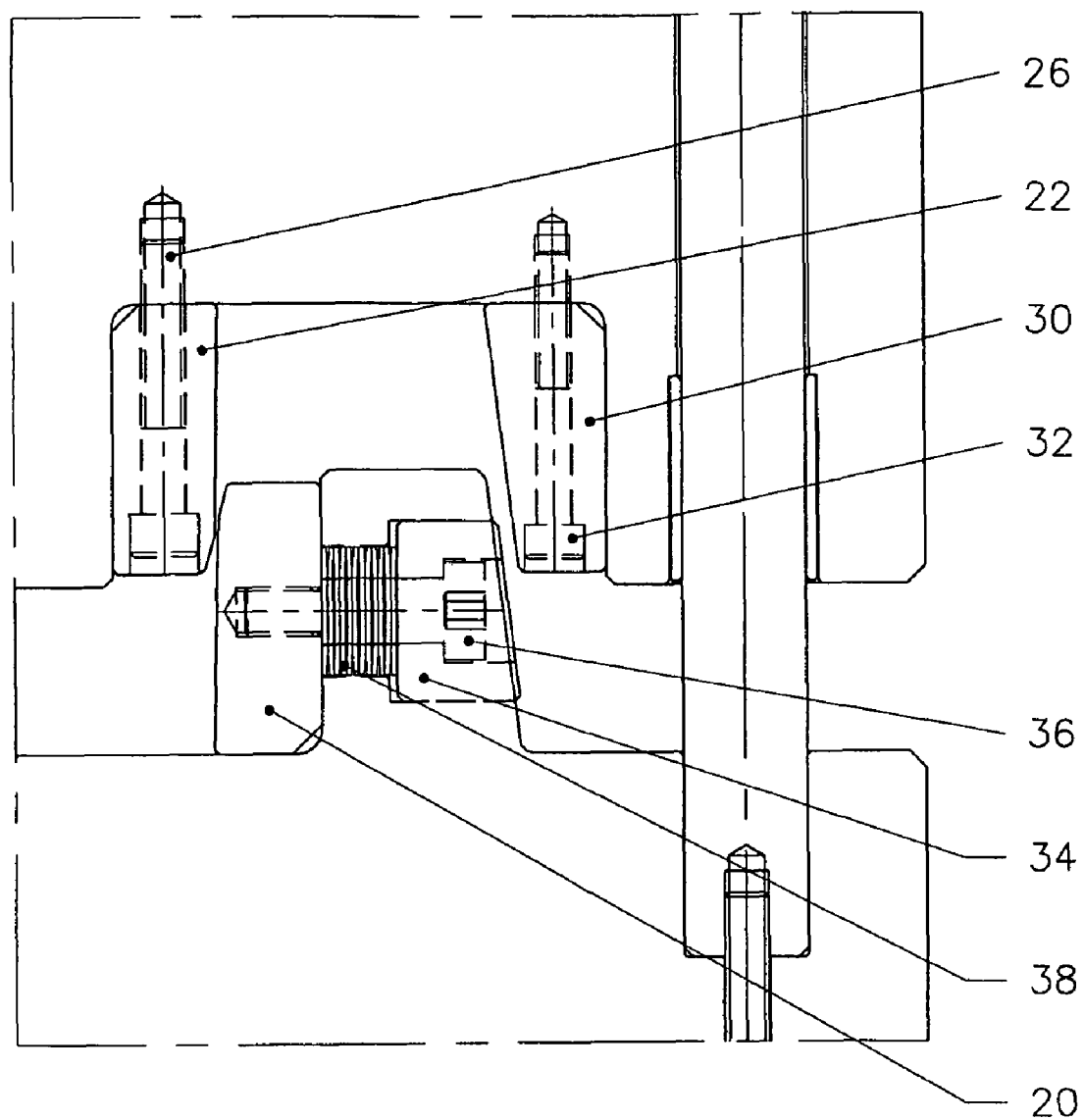
FIG. 4A is an exemplary vertical sectional view corresponding to that of FIG. 4, showing the mold in a partially open position.

As shown in FIGS. 4 and 4A, core block 12 has protrusions 28 extending forwardly towards the cavity block 14. Protrusions 28 have a straight face (90°) oriented parallel to the direction of movement of the mold, backing each core wedge 20, and an angled surface with a taper of 3° to 20° on the opposite angled lateral side (For example the embodiment of FIG. 4 shows a 7° taper on this surface). Opposite this taper of protrusions 28 is another set of cavity wedges (second cavity wedge) 30, which are firmly secured to the cavity block 14 with socket head cap screws 32 or other suitable means. It should be understood that although a preferred range of angle is 3° to 20° an angled surface with a taper of less than 3° and more than 20° is contemplated by the invention.

Figure 2:
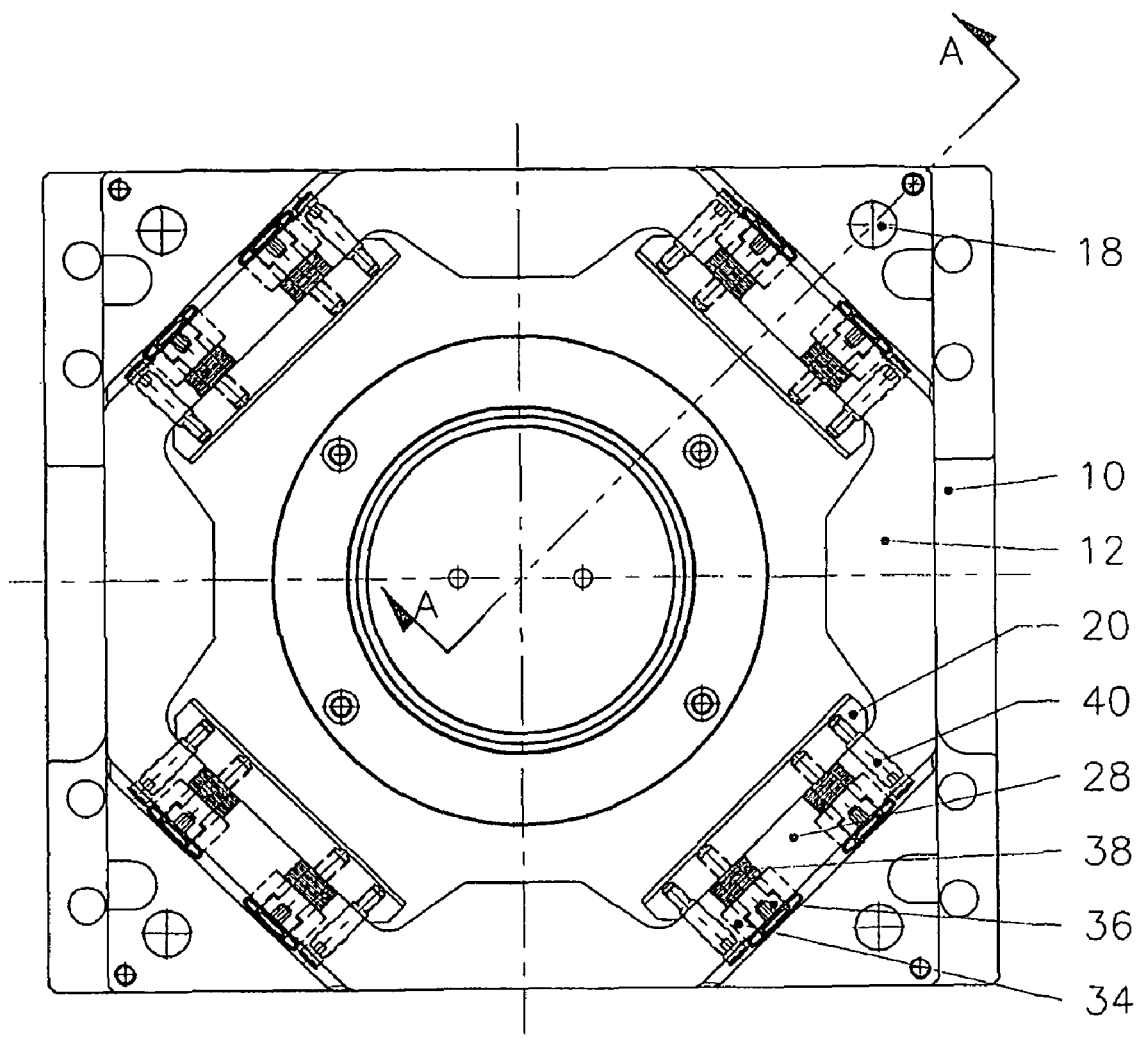
FIG. 2 is an exemplary plan view of the core half of an injection mold having a locking system in accordance with an example embodiment of the present invention.
Figure 3:
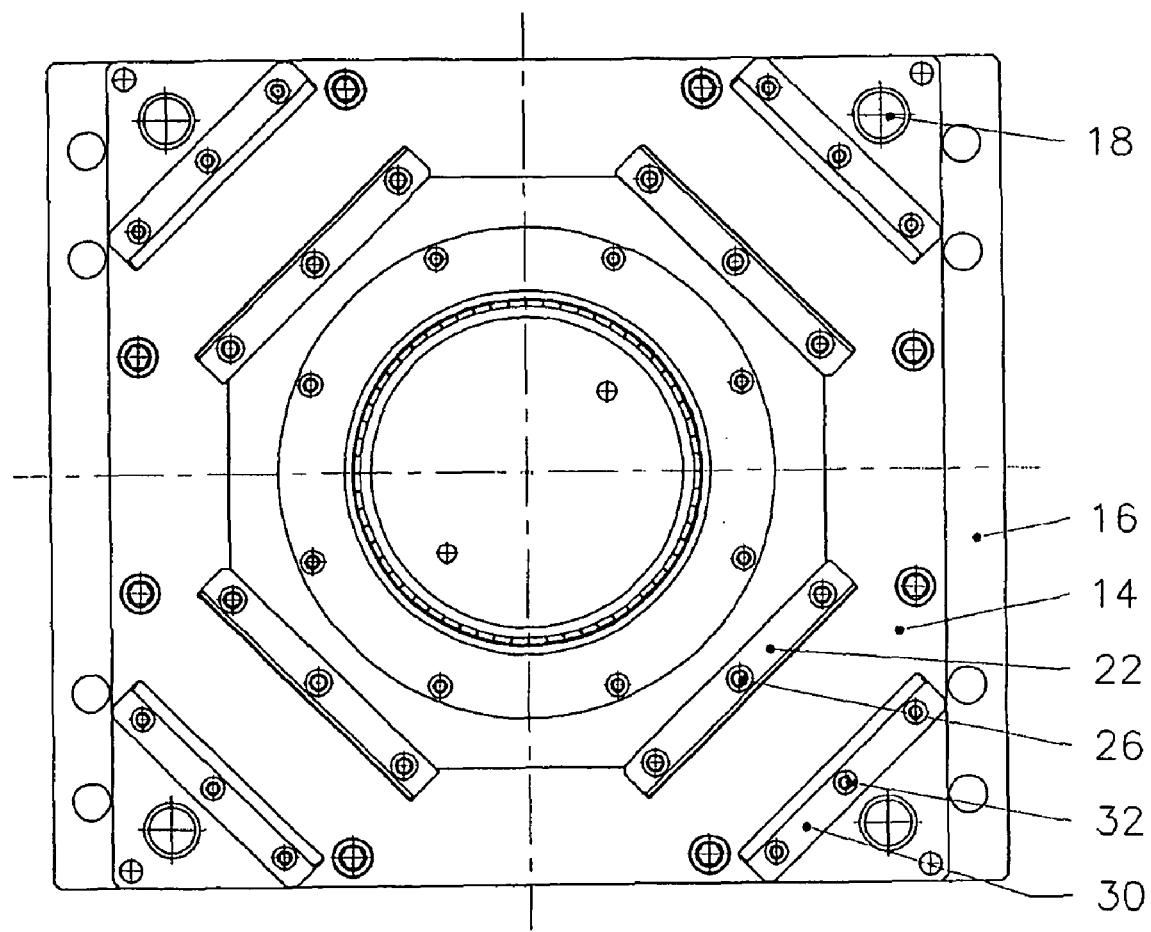
FIG. 3 is an exemplary plan view of the cavity half of the injection mold of FIG. 2.

As can be seen in FIGS. 2 and 4, 4A, each core block protrusion 28 is provided with a pair of compressible spring-loaded pucks 34 which are connected, through the protrusion to core wedges 20 by way of shoulder bolts 36. The system formed by core wedges 20, spring washers 38 (such as for example Belleville type), pucks 34 and shoulder bolts 36, has some degree of floating freedom in core block protrusions 28 when the mold is open, along axes of shoulder bolts 36.

When the mold is in open position (such as shown in FIG. 4A), compression means such as spring washers 38 release until the counter bores of pucks 34 come to rest against the heads of shoulder bolts 36. This causes core wedges 20 to be pulled against protrusions 28 as the pucks 34 extend slightly over the angled surfaces of protrusions 28. As the mold closes for a new injection cycle, cavity wedges 30 come in contact with pucks 34, causing the pucks to compress spring washers 38 and forcing the core wedges 20 into firm contact with cavity wedges 22. The combined effect of the large angle (3° to 20°) of cavity wedges 30/pucks 34 and the floating allowance of pucks 34 allows core wedges 20 and cavity wedges 22 to engage into firm contact only at the final moment of mold closing, thus preventing wear at this interface. Thus, the clamp force of the injection press is applied to the core and cavity wedge interface only in the final moments of mold closing, and is used to achieve and maintain firm contact between the wedges at all times during injection, even if the mold should breathe slightly at the parting line. Furthermore, the small angle between wedges 20 and 22 (3° or less) provides for improved concentricity.

Figure 5:
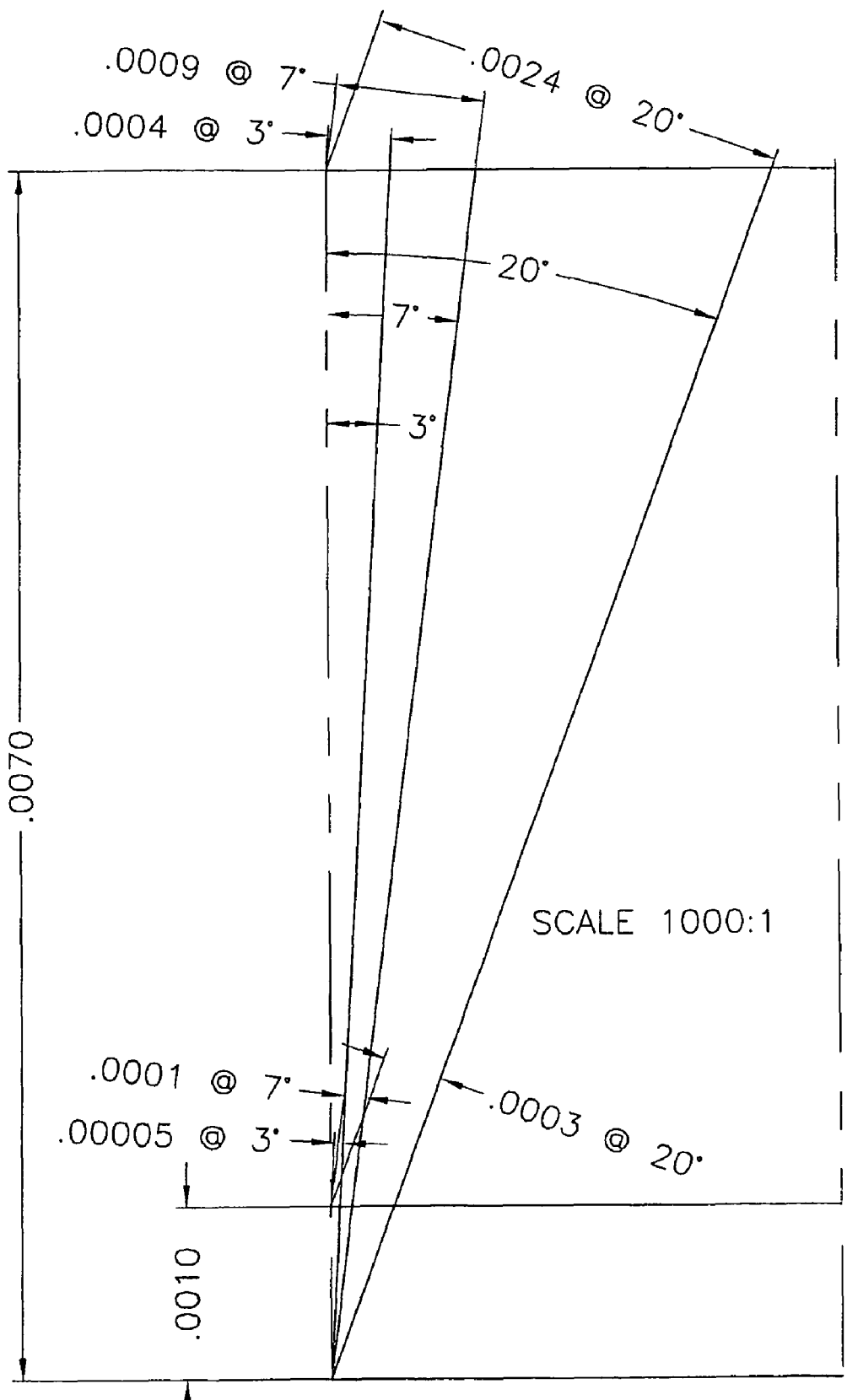
FIG. 5 is a detail showing a comparison between various angles of locking wedges in accordance with various embodiments of the invention.

As can be seen in FIG. 5, a 0.007" gap at the parting line amounts to only a 0.0004" gap between wedges having a 3° taper. Therefore, the combined effect of the main locking system having a small angle, and the spring loaded core wedges transferring the clamp force of the machine to achieve concentricity, provide a considerable improvement over prior art designs, as mold breathing ceases to have an effect on the centering of mold halves or the wall thickness of the molded part. Furthermore, as soon as the mold starts to open, the spring-loaded pucks 34 release and pull core wedges 20 away from cavity wedges 22, thus preventing galling of these items. The larger angle of protrusions 28 and pucks 34 against cavity wedges 30 allows for quick release of the effect of clamping forces on wedges 20 and 22.

As can be seen in FIG. 2, the example embodiment of the invention shows a pair of pucks 34 for each core wedge 20, but it should be understood that a larger number of pucks could be employed if desired, space permitting. Similarly, a single puck 34 could be used for each core wedge 20. While a pair of pucks 34 on each core wedge has some functionality advantages, a design with a single puck per core wedge could be utilized as a more economical alternative or for other situations, such as when space is restricted.

Further variations of the main embodiment of the invention are described below.

Figure 7:
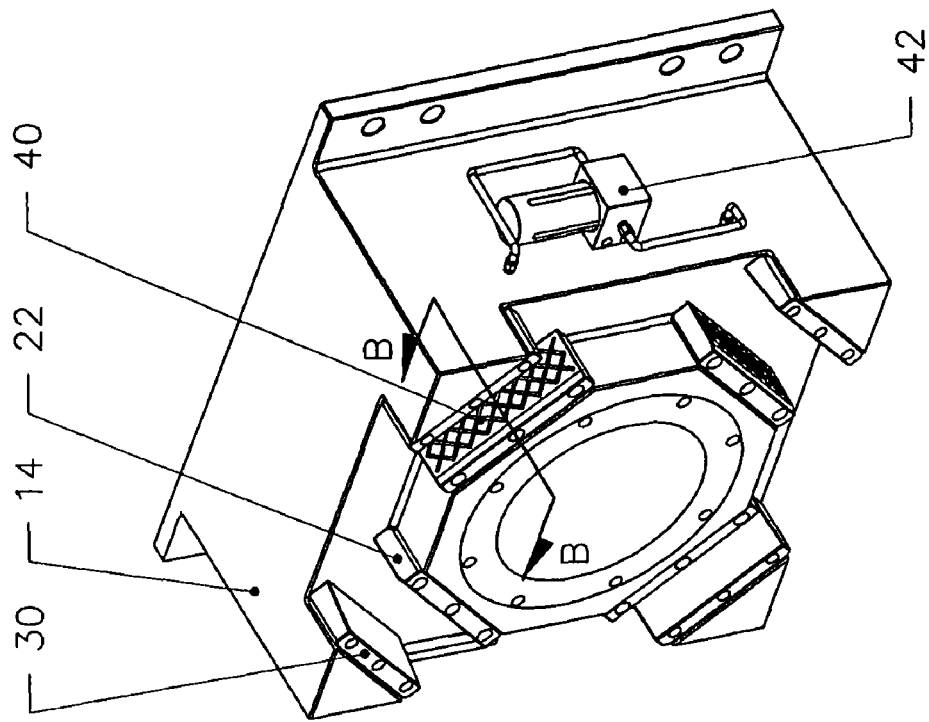
FIG. 7 is a spatial view of the mold cavity half of FIG. 3.
Figure 6:
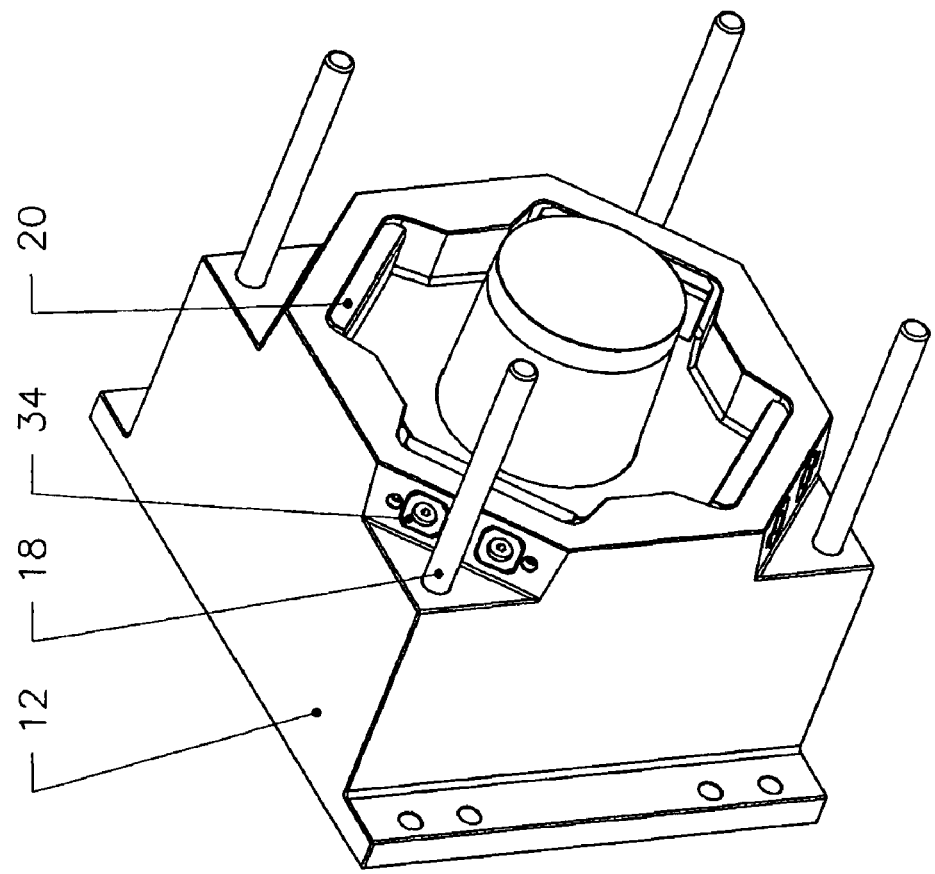
FIG. 6 is a spatial view of the mold core half of FIG. 2.

An alternate design as shown in FIG. 7 provides a network of grease grooves 40 on the active surfaces of cavity wedges 22. A supply system 42, attached to the outer surface of the mold, delivers the correct amount of grease via internal channels, through holes 44 of cavity wedges 22 to the network of grooves, to improve contact between cavity wedges 22 and core wedges 20 and further prevent wear on the 0°-3° taper.

Figures 8A, 8B:
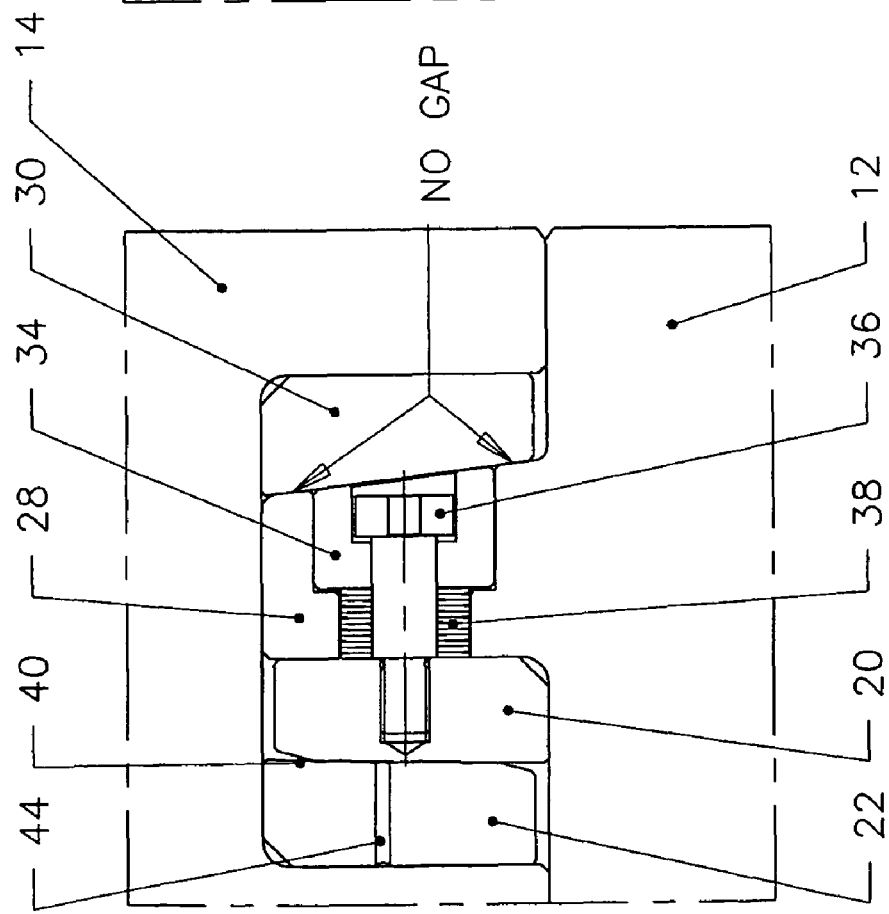
FIG. 8A is an enlarged detail of a cross-section taken along line B-B of FIG. 7, showing a gap-free design between core block and cavity wedge, having floating core wedges, spring-activated transversally.
FIG. 8B is an enlarged detail of a cross-section taken along line B-B of FIG. 7, showing a design with gap between core block and cavity wedge, having floating core wedges, spring-activated transversally.

A detail of the wedge lock system of FIG. 4 is shown in FIGS. 8A and 8B. FIG. 8A presents a gap-free design, where both core protrusions 28 and spring-loaded pucks 34 are in contact with cavity wedges 30 when mold is closed. FIG. 8B presents a design with gap, where only the spring-loaded pucks 34 are in contact with cavity wedges 30 when mold is closed, the tapered surfaces of core protrusions 28 being below the front surfaces of spring-loaded pucks 34.

Figure 4B:
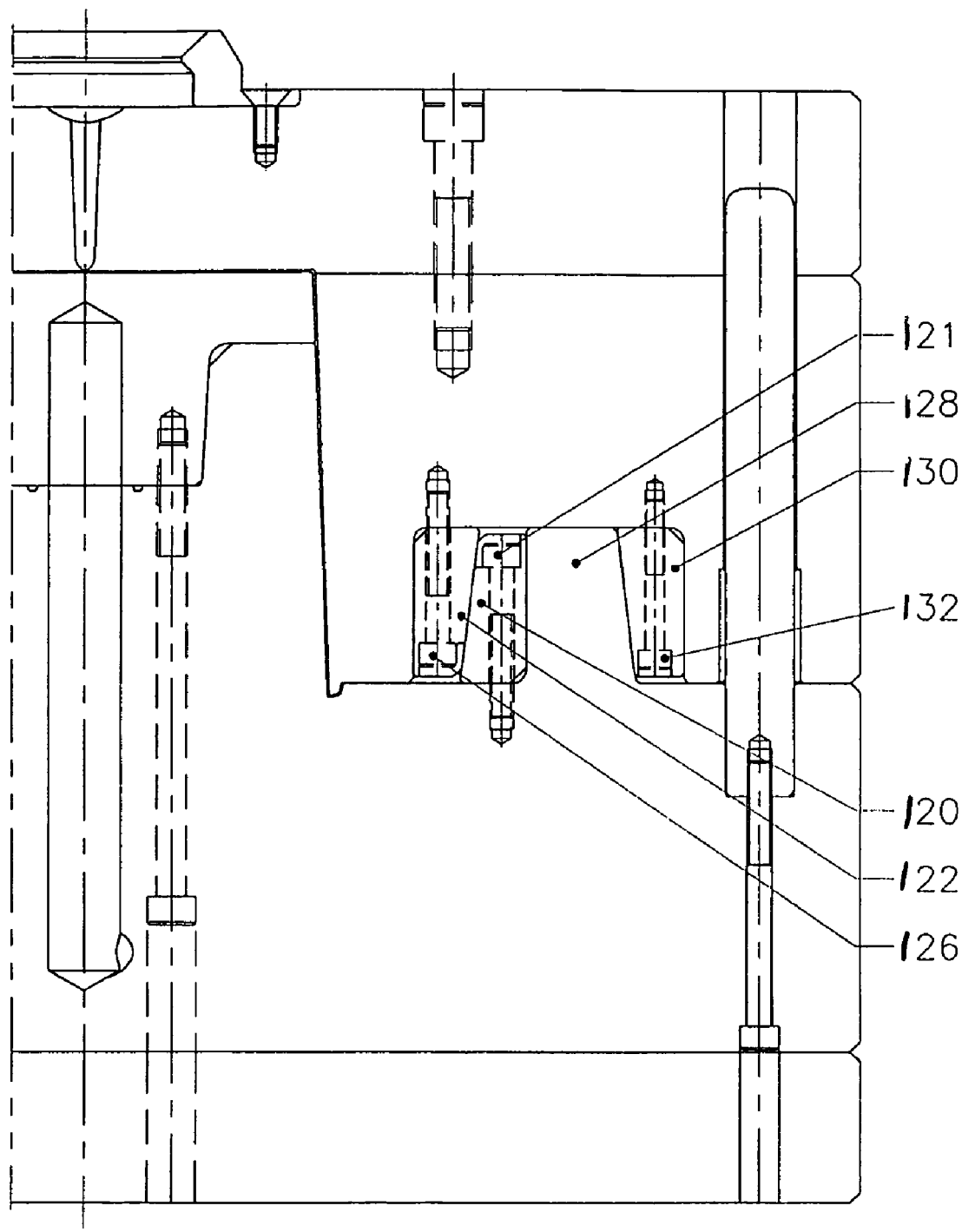
FIG. 4B is an exemplary vertical section view similar to that of FIG. 4, showing an alternate embodiment of the invention.

A version of an alternate embodiment is shown in part FIG. 4B and described herein, in which a forward protrusion (128) in the core block as shown (or alternately the cavity block)

mates with a corresponding opening in the opposite block, said protrusion having a first angled lateral side and an opposite angled lateral side. The first opposite block portion, situated opposite said first angled lateral side of the protrusion has a mating surface to the first angled side of the protrusion. The second opposite block portion is situated opposite said second angled lateral side and in said closed position, said first and second opposite block portions engage the respective first and second angled sides of the protrusions, thereby creating increased clamping force in the closed position. As shown in FIG. 4B, the opposite block is the cavity block and cavity wedges are secured to the first and second cavity block portions. If cavity wedges are present, they have mating surfaces to the angled sides of the protrusion (or if desired, such as shown, a protrusion wedge shown on one side as item 120 or protrusion wedges on both sides of the protrusion may be utilized). If protrusion wedges are utilized, the sides of the protrusion itself may or may not be angled and said cavity wedges engage the angled sides of the protrusion wedges. The angled sides of the protrusion or if present protrusion wedges attached to the protrusion are typically angled each angled at a range of 0° to 30° to said direction of mold movement, but may be even greater an angle.

An alternate embodiment is presented in FIG. 9. The design is similar to that of FIG. 8A, in that the core wedge 20' is activated transversally by spring-loaded pucks 34', but this embodiment has no taper on the active surfaces of the core and cavity wedges, the relative motion between them being allowed by a set of roller bearings 46 inserted in the active face of the core wedge 20' (and prevented from accidental removal by a slotted cover plate 48). When the mold opens, the spring-loaded pucks 34' move the core wedges 20' (complete with roller bearings 46 and cover plate 48) away from the center of the mold (away from cavity wedges 22' and out of contact with these). As the mold closes, cavity wedges 30' urge pucks 34' into their pockets in core protrusions 28', and the compressed spring washers 38' urge the core wedges 20' with roller bearings 46 into contact with cavity wedges 22', the roller bearings 46 guiding the relative travel between wedges until the mold is completely closed.

The embodiment of the invention (as presented in FIGS. 8A and 8B) and the alternate embodiment of FIG. 9 both present a core wedge design activated by springs to float in a transversal direction (along the axis of the spring-loaded pucks 34, 34').

An alternate embodiment in accordance with the invention, as shown in FIG. 10, presents a core wedge 20" floating axially (i.e. parallel to the centerline of the injection mold), as will be explained in more detail below. As shown in FIG. 10, core wedge 20", attached to core block 12" with shoulder bolts 50, is activated axially by springs 52. This design also allows for larger tapers on the active faces of core wedges 20" and cavity wedges 22", with the advantage that it achieves immediate release of contact when mold opens. The presence of cavity wedges 30" is not mandatory in this design, as the pair of core wedges 20" and cavity wedges 22" achieves the desired degree of centering accuracy. When the mold opens, springs 52 extend core wedges 20" axially away from core block 12", until they bottom out against heads of shoulder bolts 50. To prevent friction wear or seizing of the core wedges 20" against the core block 12", protrusions 28" of core block 12" are provided with wear plates 54, made of a material with low coefficient of friction, which allow axial travel of core wedges 20" with minimal surface wear.

While spring washers (Belleville type) are illustrated as means of compression to activate the pucks to provide continuous contact between the sets of wedges, it should be understood that any type of technology that achieves compression could be used, such as compressible bumpers (urethane or other non-metallic compounds), as well as other means such as gas springs.

As well, it should be understood that the floating assembly (pucks, springs, shoulder bolts and wedges), which was presented as part of the core half of the mold, could alternately be reversed and designed as part of the cavity half of the mold. In such case, the positioning of all of the components of the system would be reversed between the core and cavity side.

Furthermore, with regards to the plan views of the mold halves, in accordance with an aspect of the invention, wedges may be located at 45°, 135°, 225° and 315° (as shown in FIG. 2, 3, and spatially in FIGS. 6 and 7), but they could alternately be placed at quadrants (i.e., at 0°, 90°, 180°, and 270°) without any changes to mold behaviour. It is also contemplated that more or less than 4 wedge sets, spaced around the central axis of the mold could be utilized in accordance with an aspect of the invention.

It should be further understood that the mold may include bottom 10 and top 16 plates or alternately may have solid core and cavity blocks without backing plates, such as bottom 10 and top 16 plates). The function of the wedge lock system of the invention herein would not impacted by the presence or absence of such backing plates in the mold. In fact, some of the figures show an embodiment with backing plates (such as bottom plate 10 and top plates 16 shown in FIG. 4) and some show solid core and cavity blocks (such as in FIG. 4A). It should be understood that many changes, modifications, variations and other uses and applications will become apparent to those skilled in the art after considering the specification and the accompanying drawings. For example, each said core wedge assembly and cavity wedge may be made of high hardened low friction steel material or non ferrous low friction material, or other suitable material, not specifically described.

Therefore, any and all such changes, modifications, variations and other uses and applications which do not depart from the spirit and the scope of the invention are deemed to be covered by the invention. Accordingly, the invention should be understood to be limited only by the claims appended hereto, purposively construed.

The invention claimed is:

1. A wedge lock system for injection molds comprising a mating core block and cavity block which move between an open position and closed position, each said block including a face, and in said closed position molten plastic may be injected between the faces of said core and cavity blocks to form a plastic injection mold product, said wedge lock system comprising:

a forward protrusion in the core block which mates with a corresponding opening in the cavity block, said protrusion having a first lateral side and an opposite angled lateral side;

a first cavity wedge, secured to the cavity block, situated opposite said first lateral side;

a core wedge assembly including a core wedge piece positioned adjacent the first side of the protrusion and being connected by compressible attachment means which extends laterally through said protrusion to at least one floating puck, said at least one puck extending laterally outwardly from said angled side of the protrusion;

a second cavity wedge secured to the cavity block having a mating angled surface to the angled side of the protrusion, which in said closed position, engages the angled side of said protrusion and urges said laterally outwardly extending at least one floating puck inwardly to compress said compressible attachment means and thereby urge said core wedge piece into firm contact with said first cavity wedge.

2. A wedge lock system as recited in claim 1, wherein said first side of the protrusion and the mating side of core wedge piece are oriented parallel to the direction of movement of the mold between an open and closed position.

3. A wedge lock system as recited in claim 1 wherein the angled side of protrusion has an angled surface to the direction of mold movement of 3° to 20°.

4. A wedge lock system as recited in claim 1 wherein the interface between the core wedge piece and first cavity wedge has an angle to the direction of mold movement of no greater than 3°.

5. A wedge lock system as recited in claim 1 wherein said compressible attachment means is selected from the group consisting of: a compressible coil spring, washer spring, bumper, gas spring.

6. A wedge lock system as recited in claim 1 wherein each said core wedge assembly includes a pair of floating pucks attached to said core wedge assembly extending through said protrusion.

7. A wedge lock system as recited in claim 1 wherein the interface between the core wedge piece and cavity wedge includes a network of grease grooves on either of said cavity wedge or core wedge piece, said grooves receiving an amount of grease, delivered by delivery means to further prevent wear on the interface between said core wedge and cavity wedge.

8. A wedge lock system as recited in claim 1 wherein the interface between the core wedge piece and cavity wedge includes a set of roller bearings, guiding the relative travel between wedges as the mold moves between closed and open positions.

9. A wedge lock system as recited in claim 8 wherein said roller bearings are inserted in the core wedge piece or cavity wedge and prevented from accidental removal by a slotted cover plate.

10. A wedge lock system for injection molds comprising a mating core block and cavity block which move between an open position and closed position, each said block including a face, and in said closed position molten plastic may be injected between the faces of said core and cavity blocks to form a plastic injection mold product, said wedge lock system comprising:
    a forward protrusion in the cavity block which mates with a corresponding opening in the core block in said closed position, said protrusion having a first lateral side and an opposite angled lateral side;
    a first core wedge, secured to the core block;
    a cavity wedge assembly including a cavity wedge piece positioned adjacent the first side of the protrusion and being connected by compressible attachment means which extends laterally through said protrusion to at least one floating puck, said at least one puck extending laterally outwardly from said angled side of the protrusion;
    a second core wedge secured to the core block having a mating angled surface to the angled side of the protrusion, which in said closed position, engages the angled side of said protrusion and urges said laterally outwardly extending at least one floating puck inwardly to compress said compressable attachment means and thereby urge said cavity wedge piece into firm contact with said first core wedge.

11. An injection mold comprising a mating core block and cavity block which move between an open position and closed position, each said block including a face, and in said closed position molten plastic may be injected between the faces of said core and cavity blocks to form a plastic injection mold product, including a plurality of wedge lock systems of claim 1, each equidistantly spaced around a central axis of the mold defined along the direction of movement of the mold at regular intervals.

12. An injection mold as recited in claim 11 wherein 4 said wedge lock systems are spaced equidistantly around the central axis at 90° intervals.

13. An injection mold as recited in claim 11 wherein 8 said wedge lock systems are spaced equidistantly around the central axis at 45° intervals.

14. An injection mold comprising a mating core block and cavity block which move between an open position and closed position, each said block including a face, and whilst in closing motion, molten plastic may be injected between the faces of said core and cavity blocks to form a plastic injection mold product, including a plurality of regularly spaced wedge lock systems of claim 10.

15. A wedge lock system as recited in claim 1 wherein each said core wedge assembly and cavity wedge are made of hardened steel material or non ferrous material.

* * * * *